United States Patent Office 3,058,166
Patented Oct. 16, 1962

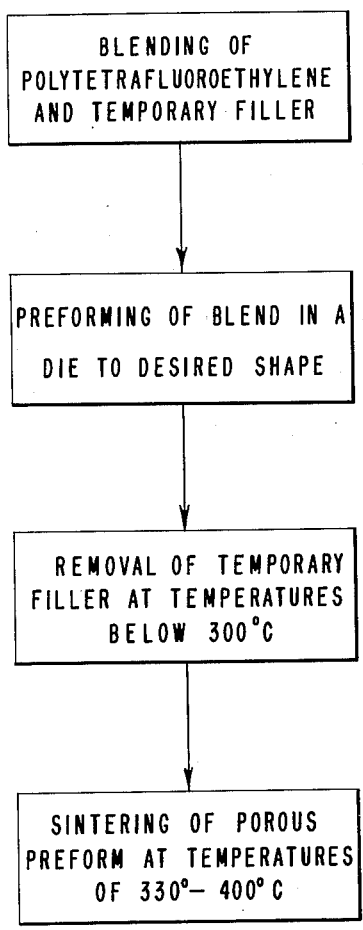

3,058,166
PROCESS FOR MAKING POROUS ARTICLES FROM FLUOROETHYLENE POLYMERS
Reuben Thomas Fields, Wilmington, Del., assignor to E. I. du Pont de Nemours and Company, Wilmington, Del., a corporation of Delaware
Filed Mar. 21, 1960, Ser. No. 16,130
5 Claims. (Cl. 18—55)

This invention relates to a process for preparing porous shaped articles from fluoroethylene polymers, and, more particularly, to a process of preparing porous articles from polytetrafluoroethylene.

Polytetrafluoroethylene, well known for its corrosion resistance, dielectric properties and high temperature stability, is a thermoplastic polymer which cannot be fabricated by standard techniques employed in the fabrication of thermoplastics, since above its crystalline melting point it forms a brittle, stiff gel, rather than a viscous fluid melt. Substantially different fabrication techniques have, therefore, been developed for polytetrafluoroethylene. In the field of foams and porous structures this applies equally well, and it has not been possible to employ blowing or foaming techniques used for other plastics in the preparation of foams and porous shapes from polytetrafluoroethylene. Although several techniques are known in the art whereby porous moldings from polytetrafluoroethylene are prepared, these techniques in many instances have not been very satisfactory in that the moldings were not completely uniformly porous and in that the resulting foams and porous moldings were much weaker than would be expected from the strength of the solid product.

It is, therefore, an object of the present invention to prepare porous moldings and foams from polytetrafluoroethylene. It is another object of the present invention to prepare uniformly porous moldings and foams from polytetrafluoroethylene, the strength of which decreases only in proportion with the density as compared to the strength of the solid nonporous product. Other objects will become apparent hereinafter.

The objects of the present invention are accomplished by a process which comprises preparing a uniform mixture of polytetrafluoroethylene and a solid organic material having a compressibility substantially equal to that of polytetrafluoroethylene and capable of gasification, i.e., decomposing into gaseous products or subliming, at a temperature below 300° C., said mixture containing from 10 to 85% by volume of said solid organic material, preforming said mixture to the desired shape at a temperature below the decomposition or sublimation temperature of said solid organic material under a pressure of at least 1500 p.s.i., removing the resulting preform from the mold, heating the preform to a temperature at or above the sublimation temperature or the decomposition temperature of said organic solid material, but below the sintering temperature of polytetrafluoroethylene of 327° C., and thereafter sintering the resulting porous preform at a temperature in the range of 330 to 400° C.

Solid organic materials, suitable as temporary fillers to form the porous preforms of the present invention include such materials as camphor, naphthalene, citric acid and cane sugar. It was discovered that these materials, when admixed with polytetrafluoroethylene in the proportions indicated, allow the formation of coherent preforms, which contain the polytetrafluoroethylene in sufficiently compressed form, on application of molding pressures exceeding 1500 p.s.i., to give rise to strong, well-formed shapes on removal of the temporary filler. The improved strength after fusion, as compared to prior art porous structures, is only obtained with fillers having a compressibility substantially the same as that of polytetrafluoroethylene. The first two temporary fillers mentioned are of the type that will sublime at elevated temperatures below 300° C. The latter two are of the type that will melt and then decompose at temperatures below 300° C. into gaseous products leaving only a minor carbon residue. In some instances, it is desirable to leave such a carbon residue in the porous preform prior to sintering. On sintering of the porous preform, the carbon becomes incorporated into the surface of the cells formed in the preform and improves the heat dissipating properties of the resulting article. The sublimation or decomposition of the solid organic material is generally carried out at a gradual rate to allow permeation of the decomposition products or the vaporized solid material through the polytetrafluoroethylene preform.

It is essential that the sublimation or decomposition of the solid organic material employed is carried out below the sintering temperature of the polytetrafluoroethylene. Preformed polytetrafluoroethylene, prior to sintering into a homogeneous, dense mass, permits the ready volatilization and escape of the solid organic materials incorporated into the preform. It is, thus, possible to obtain porous preforms with uniform cell sizes and, furthermore to obtain the complete removal of the added organic solid materials. The dimensions of the preform remain unchanged during the organic solid material removal step. The change in dimension occurring during the sintering step of the porous preform is substantially the same as the change in dimensions resulting on sintering of a solid polytetrafluoroethylene.

In general, the process of the present invention is carried out by mechanically mixing the polytetrafluoroethylene and the temporary filler to a homogeneous mixture. Although the particle size of the polytetrafluoroethylene may be varied within wide ranges, it will be apparent to one skilled in the art that a small particle size of the polytetrafluoroethylene will more readily allow the molding of a uniform preform and, hence, the particle size of the polytetrafluoroethylene is generally maintained below an average size of 100 mils. The size of the filler particle in the mixture may also be greatly varied, depending on the use to which the sintered structure is to be put, and this is an additional advantage over prior art techniques to preparing porous polytetrafluoroethylene structures. It is preferred, where the size of the cell structure is not critical, to have the polytetrafluoroethylene particle and the filler particle small in size and in the same range. This is readily achieved by preparing a rough mixture of the components and then subjecting the mixture to a grinding operation, such as liquid nitrogen grinding, which will give rise to a homogeneous mixture of filler and polymer having small particle size.

The mixture so obtained is then preformed in accordance with known techniques developed for polytetrafluoroethylene. It was found necessary, however, to apply molding pressures in excess of 1500 p.s.i. to obtain a preform which subsequently can be sintered into a strong porous shape. Apparently, such pressures are necessary to result in a well-knit web of polymer particles and thereby give the unsintered preform sufficient coherence to allow removal of the volatile filler without disruption of the unsintered polymer particles in the preform. The removal of the volatile filler must be carried out at temperatures below the sintering temperature in order to assure complete removal of the filler without causing fissures and other defects in the porous structure. Removal of the filler during the sintering step will result in such defects, apparently because of the impermeability of sintered polytetrafluoroethylene and the extreme brittleness of polytetrafluoroethylene above its crystalline melting point. The sintering step which follows the volatile filler removal step is again in accord with prior art practice.

The steps involved in the fabrication of porous articles by the process of the present invention are further schematically illustrated in the attached drawing.

Although the invention is described with particular reference to polytetrafluoroethylene, it can be similarly employed in related fluorocarbon polymers which form a non-flowing gel above their crystalline melting point and which, therefore, can be free-sintered. By polytetrafluoroethylene is meant such high molecular weight, solid polymers of tetrafluoroethylene as are commercially available under the trademark "Teflon."

The process of the present invention is further illustrated by the following example.

Example

A mixture of 20 g. of naphthalene crystals and 20 g. of polytetrafluoroethylene molding powder, commercially available as "Teflon" 5, was prepared by admixing in a Waring Blendor. The mixture was placed in a 2" diameter stainless steel chip mold and compression molded at a pressure of 6000 lbs. A half inch chip, 2" in diameter was thereby obtained. The molded chip was heated gently to evaporate the naphthalene by placing it in an oven at 50° C. and gradually increasing the temperature to 150° C. over a period of 16 hrs. The molded piece was maintained at 150° C. for 12 hrs. Thereupon, the temperature was raised to 300° C. for about 30 min. On cooling, the chip was examined; a porous preform had been obtained, showing no traces of the naphthalene. The chip was then sintered at a temperature of 380° C. for a period of 90 min. The sintered molded piece was removed from the oven and allowed to cool to room temperature. The sintered chip had retained its shape well, was tough, and could be flexed only on use of considerabl force. The finished piece had a diameter of 1.950 in. and a thickness of 0.49 in. It weighed 20.0 g. The density of the chip was 0.83 as compared to the density of solid polytetrafluoroethylene of approximately 2.2. The test was repeated using camphor, citric acid and cane sugar, instead of naphthalene. In the case of camphor, the chip was maintained at a temperature of 250° C. to remove the solid filler, in the case of cane sugar, at 250° C., and, in the case of citric acid, at 250° C. Substantially the same results were obtained in each instance, except that in the case of the cane sugar and citric acid, the chip assumed a blackish cast on sintering, indicating a deposit of carbon on the surface of the polymer, as well as on the cell walls of the polymer. In all instances, with exception of the carbon deposit, the solid organic material was uniformly removed on sintering.

The foams and porous moldings obtained by the process of the present invention are highly suitable as dielectric media, as insulating materials, both for electric current as well as for high temperatures. The porous material of the present invention is, furthermore, highly useful as a sacrificial covering or coating for the dissipation of heat while simultaneously acting as a heat insulator, since polytetrafluoroethylene decomposes at temperatures above 450° C. into gaseous components. Porous polytetrafluoroethylene containing carbon aids further in heat dissipation by radiation.

I claim:

1. A process for preparing porous polytetrafluoroethylene moldings which comprises preparing a uniform mixture of polytetrafluoroethylene powder and from 10 to 85% by volume of a solid organic material having a compressibility substantially equal to that of polytetrafluoroethylene and capable of gasification at a temperature below 300° C., molding said mixture at a temperature below said gasification temperature and at a pressure of at least 1500 p.s.i., removing the resulting preform and heating the preform at a temperature ranging from the gasification temperature to 327° C. until all vaporizable material has been removed, and thereafter sintering the resulting preform at a temperature of 330 to 400° C.

2. A process for preparing porous polytetrafluoroethylene moldings which comprises preparing a uniform mixture of polytetrafluoroethylene powder and from 10 to 85% by volume of a solid organic material selected from the class consisting of camphor, naphthalene, cane sugar and citric acid, molding said mixture at a temperature belw the gasification temperature of said solid organic material, and at a pressure of at least 1500 p.s.i., removing the resulting preform, heating the preform at a temperature ranging from the gasification temperature to 327° C. until all of said solid has been removed, and thereafter sintering the resulting porous preform at a temperature of 330 to 400° C.

3. The process as set forth in claim 2 wherein the solid is naphthalene and wherein the gasification temperature is 150° C.

4. The process as set forth in claim 2 wherein the solid is cane sugar and wherein the gasification temperature is 250° C.

5. The process as set forth in claim 2 wherein the solid is citric acid and wherein the gasification temperature is 250° C.

References Cited in the file of this patent

UNITED STATES PATENTS

| | | |
|---|---|---|
| 1,742,515 | Mandell | Jan. 7, 1930 |
| 1,873,223 | Sherwood | Aug. 23, 1932 |
| 1,934,383 | Stafford | Nov. 7, 1933 |
| 2,085,047 | Schneider | June 29, 1937 |
| 2,252,277 | Tate et al. | Aug. 12, 1941 |
| 2,356,076 | Moberly | Aug. 15, 1944 |
| 2,400,091 | Alfthan | May 14, 1946 |
| 2,413,498 | Hill | Dec. 31, 1946 |
| 2,456,262 | Fields | Dec. 14, 1948 |
| 2,710,991 | Squires | June 21, 1955 |
| 2,985,918 | Moore et al. | May 30, 1961 |